F. I. BENNETT.
STEERABLE SLED.
APPLICATION FILED JULY 11, 1914.
1,160,130.
Patented Nov. 16, 1915.
2 SHEETS—SHEET 1.
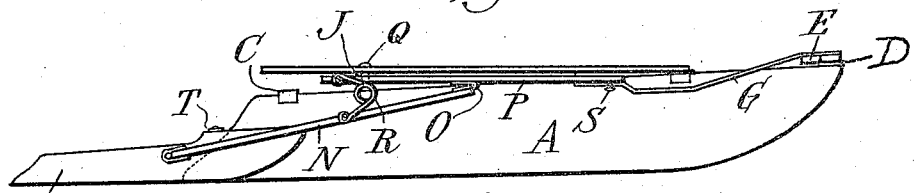
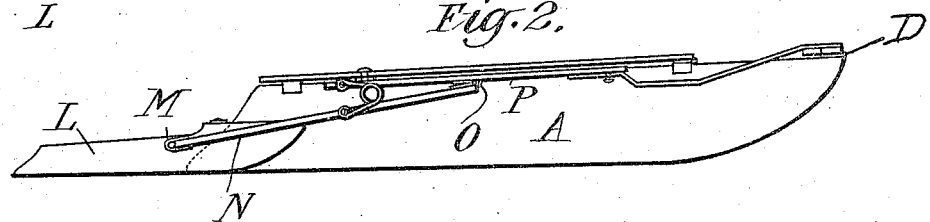
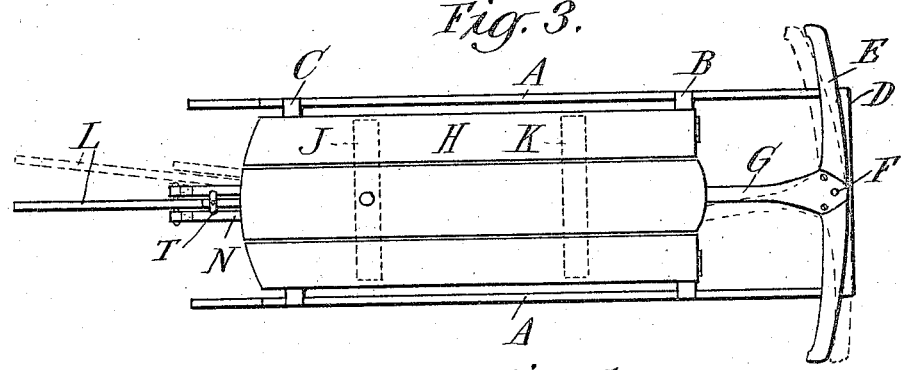
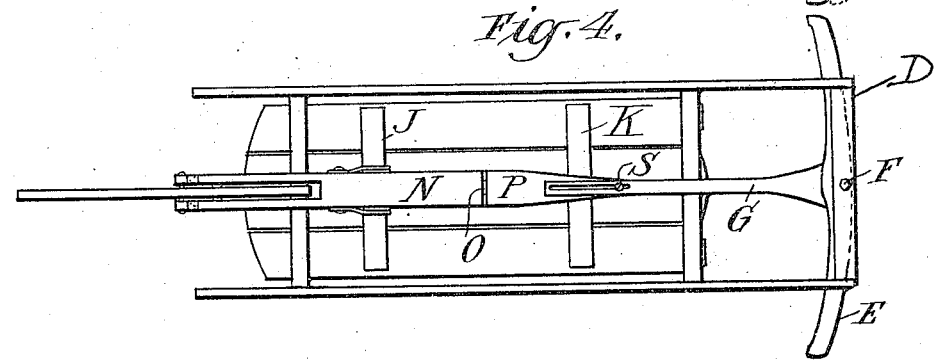
WITNESSES:
Lulu Stubenvoll
William K. Seewagen
INVENTOR
Francis I. Bennett
BY
D. Anthony Usina ATTORNEY F. I. BENNETT.
STEERABLE SLED.
APPLICATION FILED JULY 11, 1914.
1,160,130.
Patented Nov. 16, 1915.
2 SHEETS—SHEET 2.
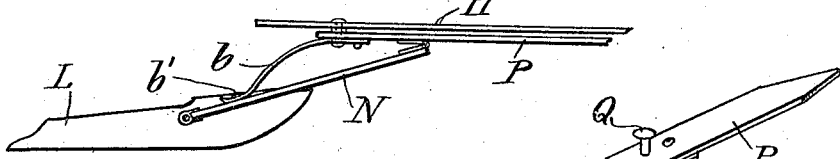
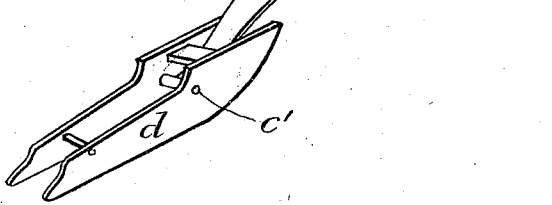
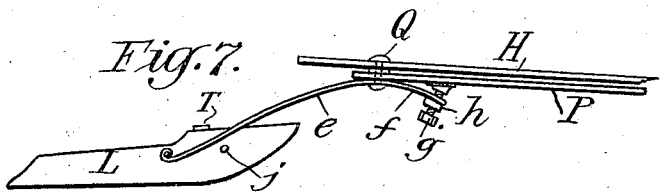
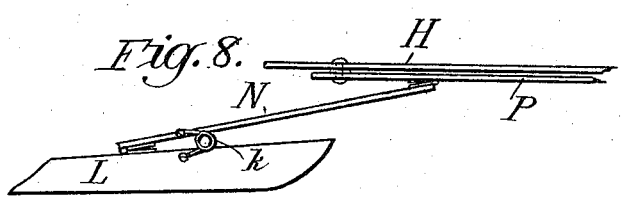
WITNESSES:
Lulu Stubenvoll
William K. Seewagen
INVENTOR
Francis I. Bennett
BY
W. Anthony Usina ATTORNEY

UNITED STATES PATENT OFFICE.

FRANCIS I. BENNETT, OF NUTLEY, NEW JERSEY.

STEERABLE SLED.

1,160,130.     Specification of Letters Patent.     Patented Nov. 16, 1915.

Application filed July 11, 1914. Serial No. 850,423.

*To all whom it may concern:*

Be it known that I, FRANCIS I. BENNETT, a citizen of the United States, residing in Nutley, New Jersey, have invented certain new and useful Improvements in Steerable Sleds, of which the following is a specification.

This invention aims to provide an improved sled which can be steered more accurately and around a shorter curve than those heretofore in use.

Other points of improvement are referred to in detail hereinafter.

The accompanying drawings illustrate coasting sleds embodying the invention.

Figures 1 and 2 are side elevations, with the near runner removed, of one embodiment; Figs. 3 and 4 are respectively a top plan view and an under side plan view of the same; Figs. 5, 6, 7 and 8 are diagrammatic views illustrating other embodiments of the invention.

The sled is provided with any usual or suitable side runners A connected by cross bars B and C and a third cross bar D at the front carrying the steering handle E which is pivoted thereto at F and provided with a rearwardly extending arm G hereinafter described. The floor or deck H comprising three boards fastened together by cross bars J and K is hinged on the forward cross bar B and adapted to rest on the rear cross bar C when the weight of the rider is on it. The deck, of course, may be of any usual or suitable construction.

A rudder L is arranged at the rear, preferably in the form of a single blade pivotally mounted as by means of hinges M in the forked end of a connecting bar N so that the rudder may rock as it runs over inequalities of the ground and maintain a long bearing at all times. The connecting bar N is supported at its forward end by a hinge O on the underside of a lever P which is pivoted on a pin Q passing through the deck and the cross bar J. The connecting bar N is connected to the lever P also by means of a coiled spring R at each side, the ends of which are connected respectively to the lever and the connecting bar. The lever P is provided on its underside with a pin S engaging a slot in the rear end of the steering arm G which is rigidly connected to the tiller or steering handle E. The portion of the rudder forward of the pivotal support M is slightly heavier than the rear portion and is provided with a stop consisting of a cross piece or button T adapted to strike the upper edge of the forked connecting bar N and to limit the downward movement of the forward end of the rudder when the sled is lifted, so that the rudder will be held in an approximately horizontal position and will naturally assume the position shown in Fig. 1 when the sled is placed on the ground. Also when the sled is held above the ground the hinge O and springs R hold up the connecting bar N which carries the rudder. The forward end of the rudder is limited in its upward movement by the cross bar C. Various other means may be provided for limiting the rocking movement of the rudder to hold it in approximately horizontal position at all times.

When the sled is placed on the ground with no weight on it the parts assume the position of Fig. 1, the rudder bears on the ground with a pressure proportioned to its weight and the weight which it carries, namely, part of the connecting bar, lever, springs, and deck. The weight of the deck, however, is not sufficient to bring it down on the rear cross bar C. In this condition the sled can be pulled up hill with ease. In coasting the added weight of the rider on the deck presses down the rear end of the latter, compressing the spring and thus increasing the pressure on the rudder so that the latter bites deeper into the snow. As the handle E is turned one way or the other the rudder is swung to the right or to the left about a vertical axis Q as, for example, to the position shown in dotted lines in Fig. 3 and steers the sled firmly about a comparatively sharp curve.

The principle of the invention may be embodied in a great variety of apparatus, examples of which are shown in the following figures; and it will be understood that these are only typical of a number of variations which may be made in detail and in the arrangement of the parts.

Fig. 5 shows flat springs *b* substituted for the coiled springs R of Fig. 1, the upper ends of these flat springs being fixedly attached to the rear end of the lever P and the lower ends of the springs being loosely attached to the connecting bar N by means of screws *b'* passing through slots in the springs to allow for a slight longitudinal motion. The construction is in other respects the same as in Fig. 1.

The connecting bar and spring may be combined in one member, as in Fig. 6, where the flat leaf spring $c$ (either a plurality of leaves as shown, or a single leaf) has its rear end pivotally connected at $c'$ to the rudder $d$ and is fixedly connected at its upper end to the rear end of the lever P, which is pivoted at Q and is operated as in Fig. 1. A double rudder $d$ is shown in this figure and it will be understood that the same form of rudder may be applied with the other controlling mechanisms herein illustrated and described. This double style of rudder is especially useful in heavier sleds.

Fig. 7 illustrates the manual adjustability of the strength of the spring, which feature may be applied in various ways to the several constructions shown. In this figure the movable deck H and lever P are as in Fig. 1 and the rudder L is connected to a flat spring $e$ which is connected by the pivot pin Q to the lever P and which has a forwardly extending arm $f$ through which passes a bolt $g$, the inner end of which is fastened in a block fixed on the underside of the lever P. A nut $h$ on the bolt $g$ may be screwed up to press upward the portion of the spring and to press downward the portion $e$ so as to increase the compression on the latter. In this figure the means for limiting the rocking movement of the rudder comprise a cleat T as in Fig. 1 and a pin $j$ located a slight distance under the spring $e$ to allow the necessary play, but to strike the spring and prevent excessive upward movement of the forward end of the rudder. The springs may be applied also, as in Fig. 8, between the connecting bar N and the rudder L. In this case spiral springs $k$ at the sides similar in design to the springs R in Fig. 1 are used. Otherwise the construction is as in Fig. 1.

The movement of the steering handle may be transmitted to the rudder by various other known or suitable means than those illustrated. It is not necessary that the entire deck be movable. There may be a fixed portion as well as the movable portion through which the added pressure is applied to the spring. The making of the pressure on the rudder dependent upon the weight on the deck of the sled, with the interposition of a spring between the rudder and the applied weight, insures a proper proportion of the total weight on the rudder at all times to make the sled steer well. The spring which presses the rudder down reacts against the deck of the sled either directly as in Fig. 1 or indirectly as in Fig. 8 to press the deck upward so that any load applied on the deck increases the downward pressure of the spring on the rudder. The load on the rudder is so applied that whatever the inequalities of the ground and whatever the relative positions of the side runners the rudder will always press with a sufficient pressure in the track of the sled between the runners.

What I claim is—

1. A sled having supporting runners, a deck supported by said runners and vertically movable relatively thereto, a rudder which is bodily movable relatively to said deck, and a spring bearing downward against said rudder and upward against said deck so as to slightly lift the latter normally and so that a weight on the deck will increase the pressure of said spring while leaving the rudder free to move vertically relatively to the deck.

2. A sled having supporting runners, a deck supported by said runners and vertically movable relatively thereto, a rudder which is bodily movable relatively to said deck, a connecting bar carrying said rudder, and connecting the same to said deck and a spring bearing downward on the connecting bar and upward against said deck so as to slightly lift the latter normally and so that a weight on the deck will increase the pressure of said spring while leaving the rudder free to move vertically relatively to the deck.

3. A sled having supporting runners, a rudder, a connecting bar carrying said rudder, a lever pivoted on a vertical axis and carrying said connecting bar, a deck pivotally mounted and carrying said lever and a spring bearing downward against said rudder and upward against said deck so as to slightly lift the latter normally and so that a weight on said deck will increase the pressure of said spring.

4. A sled having supporting runners, a rudder, a connecting bar pivotally engaging said rudder to permit it to rock, a lever pivoted on a vertical axis and carrying said connecting bar, a deck pivotally mounted and carrying said lever, and a spring bearing downward against said rudder and upward against said deck so as to slightly lift the latter normally and so that a weight on said deck will increase the pressure of said spring.

In witness whereof, I have hereunto signed my name in the presence of two subscribing witnesses.

FRANCIS I. BENNETT.

Witnesses:
D. ANTHONY USINA,
LULU STUBENVOLL.